(12) United States Patent
Aubuchon et al.

(10) Patent No.: US 7,688,960 B1
(45) Date of Patent: Mar. 30, 2010

(54) METHOD AND SYSTEM FOR SEPARATING BUSINESS AND DEVICE LOGIC IN A COMPUTING NETWORK SYSTEM

(75) Inventors: Kenneth James Aubuchon, Lenexa, KS (US); Kay Ellen Mitchell, Kansas City, MO (US); Benjamin David Kimminau, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 2520 days.

(21) Appl. No.: 10/083,064

(22) Filed: Feb. 26, 2002

(51) Int. Cl.
*H04M 3/42* (2006.01)
(52) U.S. Cl. ............... 379/201.12; 379/201.03; 379/201.05; 379/207.02; 379/221.09; 455/3.03; 455/418; 705/1; 709/203; 709/238; 709/243; 709/244; 717/171; 717/172; 717/173
(58) Field of Classification Search ............ 379/201.12, 379/201.03, 201.02, 201.05, 207.02, 221.09; 455/3.03, 418; 705/1; 709/203, 238, 243–244; 717/171–173
See application file for complete search history.

(56) References Cited

U.S. PATENT DOCUMENTS

| | | | | |
|---|---|---|---|---|
| 5,559,877 A * | 9/1996 | Ash et al. | ............... | 379/201.05 |
| 5,634,126 A * | 5/1997 | Norell | ................ | 718/104 |
| 5,875,242 A * | 2/1999 | Glaser et al. | ........... | 379/201.05 |
| 5,881,131 A * | 3/1999 | Farris et al. | ............... | 379/15.03 |
| 6,246,678 B1 * | 6/2001 | Erb et al. | ................ | 370/352 |
| 6,622,016 B1 * | 9/2003 | Sladek et al. | ............. | 455/414.1 |
| 6,633,638 B1 * | 10/2003 | De Trana et al. | ............. | 379/242 |
| 6,668,053 B1 * | 12/2003 | Doleac et al. | ................ | 379/243 |
| 6,778,651 B1 * | 8/2004 | Jost et al. | ................ | 379/201.01 |

* cited by examiner

*Primary Examiner*—Hemant Patel (57) ABSTRACT

The present invention is directed to a method and system for use on a computer for the automated generation of commands or other data to populate tables of a database. The automated generation process of the present invention entails separating business logic from device specific logic, defining the organization of incoming data, identifying and setting default data parameters, defining the format for the output data, and implementing the command generating object oriented classes in program source code, to generate device specific commands.

3 Claims, 6 Drawing Sheets

METHOD AND SYSTEM FOR SEPARATING BUSINESS AND DEVICE LOGIC IN A COMPUTING NETWORK SYSTEM

STATEMENT REGARDING FEDERALLY-SPONSORED RESEARCH OR DEVELOPMENT

None.

CROSS-REFERENCE TO RELATED APPLICATIONS

None.

TECHNICAL FIELD

The present invention relates to computing network systems, such as telecommunications networks. More particularly, the invention relates to a system and method for segregating business logic from computing device specific logic, so as to minimize the impact of device changes and facilitate the implementation of business logic across multiple or dissimilar computing devices.

BACKGROUND OF THE INVENTION

Technology based industries offer a host of products and services that involve the specific configuration or programming of various computing devices. The logic that is implemented on these computing devices are driven by business objectives. These business objectives routinely change in response to competition, consumer needs and other such dynamics. An industry that exemplifies these characteristics is the telecommunications companies.

Telecommunications companies offer a wide variety of services to homes and businesses. These services require a wide range of sophisticated computing devices, including communications devices such as switches, routers and a host of other components. For example, a telecommunication company that offers broadband services, which carries voice, data and video over one connection, requires the use of particular routing switches. As would be understood, different business services or offerings from the company may require different switches and at the very least, different configuration of similar switches. Examples of such telecommunications switches include Telcordia Service Manager, Lucent Autoplex 1000 and Nortel MTX.

Switches typically support and include a number of data tables. There are tables for such things as customer information, routing data and network architecture information. The number of tables depend upon the type of switch and can vary greatly, for instance from eight tables for one particular type of switch to thirty tables for another particular type of switch. One such table, commonly referred to as a Digit Translator table, includes information used to group sets of phone number digits together. These are phone numbers that should be routed and charged the same. Another table, commonly referred to as a Group Translator table includes information used for routing and charging calls based on the grouping of digits in the Digit Translator table. The information in the Group Translator table matches attributes of the caller (such as geographic area and originating service), to determine whether to complete a call and, if so, to what destination.

Because of cost and infrastructure constraints, broadband communications services are currently provided to cities or regions having populations of 50,000 or more. These cities or regions are commonly referred to as metropolitan statistical areas (MSAs). Each time broadband communications services are to be provided to a new MSA, one or more routing switches must be setup with core call routing for the MSA. Core call routing determines, among other things, how calls are routed between an originating number and a terminating number. Core call routing also determines whether calls are billed as local calls or long distance calls. Call routing is based upon the area where a call originates and requires an accurate call routing scheme in order to terminate the call correctly.

Establishing core call routing for an MSA is a complex process requiring a review of that MSA's area codes commonly referred to as Numbering Plan Administration (NPAs), the first three digits of all telephone numbers for the area (commonly called NXXs), and 7-digit versus 10-digit dialing patterns between NPAs (such as 816 versus 913 area code dialing in the Kansas City MSA). Also reviewed are trunk groups, terminating end offices, and files which are used to differentiate local calls from long distance calls. Two of the most time consuming tasks in setting up core call routing are creating the Digit and Group Translator tables referenced above.

For an average MSA, a communications company can spend up to eight weeks manually generating all necessary call routing data. Creation of the Digit Translator and Group Translator table for the New York MSA for example, required the assembly and review of 184,000 rows of call routing information to build the appropriate call routing.

The complexity and the singularity of an MSA's local call routing eliminates the possibility of creating call routing data that can be copied from an existing MSA and used for a new MSA. In addition, the variation between different switches, even those from the same manufacturer, further preclude the possibility of copying call routing data between switches. This means that the process involved in the creation of call routing data must be repeated every time a new switch is setup, a new MSA is added to an existing switch, a new switch element is introduced in the network or when other changes are made on the telecommunication network. These are examples of business logic modifications that can create substantial time and money delays in modifying a telecommunications network.

The ability for a telecommunications company to offer expanded services and upgrades, is dependent upon its ability to quickly and cost effectively implement business requirements. As previously noted, business requirements are in turn implemented on communication network equipment such as, through the setup, loading and maintaining of call routing information in various switches. As described above, if this process is tedious, it hampers the ability of a company to compete. For example, when a business logic change (such as the need to add a new area code to a city) is warranted, there must be some corresponding programming and reconfiguration of various switches and other network devices. As would be understood, the network has a variety of switches from different manufactures which require different configuration. As such, the process of reconfiguring each of those switches would greatly delay the implementation of the desired area code addition. Accordingly, there exists a need for a system and method to simplify service expansion or upgrades in a quick and cost effective manner. More particularly, there is a need to be able to implement such expansions or upgrades efficiently across similar and dissimilar switches without the need to recompile programs for each switch.

SUMMARY OF THE INVENTION

The present invention overcomes the problems described above. More particularly, the present invention minimizes the impact of device changes and facilitates the implementation of business logic across multiple or dissimilar computing devices, by segregating business logic from the specific logic of the computing devices.

The present invention provides the automated generation of commands or other data to populate tables of a database. The automated generation process of the present invention entails separating business logic from device specific logic, defining the organization of incoming data, identifying and setting default data parameters, defining the format for the output data, and implementing the command generating object oriented classes in program source code, to generate device specific commands.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means, instrumentalities and combinations particularly pointed out in the appended claims.

BRIEF DESCRIPTION OF THE SEVERAL VIEWS OF THE DRAWING

In the accompanying drawings which form a part of the specification and are to be read in conjunction therewith, and in which like reference numerals are employed to indicate like parts in the various views.

DETAILED DESCRIPTION OF THE INVENTION

The present invention is directed to a system and method for segregating business logic from computing device specific logic to minimize the impact of device changes, and to facilitate the implementation of business logic across multiple or dissimilar computing devices. The particular embodiments described herein are intended in all respects to be illustrative rather than restrictive. Alternative embodiments will become apparent to those skilled in the art to which the present invention pertains without departing from its scope. Accordingly, the system and method of the present invention will be described with reference to telecommunications. More particularly, the present invention will be described with reference to routing switches and their associated configuration. Despite the embodiment described herein, it would be understood by those skilled in the art that the present invention can be implemented in hardware, software, firmware, or a combination thereof.

The present invention provides the automated generation of commands or other data to populate tables of a database. The automated generation process of the present invention first entails separating business logic from device specific logic. This is followed by defining how incoming data is organized, then identifying and setting default data parameters. The format for the output data is also defined and finally command generating object oriented classes are implemented in program source code, to execute on one or more computer systems and subsequently generate specific commands for data tables of the network devices.

It would be understood by those skilled in the art that while the present invention is described with reference to a telecommunications switches, the system and method of the present invention is applicable to other applications that require the generating of rows of data or command statements for any type of database, and such application should be considered within the scope of the present invention. The particular embodiments described herein are intended in all respects to be illustrative rather than restrictive. Alternative embodiments will become apparent to those skilled in the art to which the present invention pertains without departing from its scope.

The present invention may be described in the general context of computer-executable instructions, such as program modules, being executed by one or more computing devices in a network environment. Generally a network includes several similar or dissimilar devices connected together by some transport medium, which enables communication between the devices by using a predefined protocol. Those skilled in the art will appreciate that the present invention may be practiced within a variety of network configuration environments and on a variety of computing devices, including hand-held devices, consumer electronics, and the like. The invention also may be practiced in a wireless computing environment.

Exemplary Operating Architecture

Figure 1:
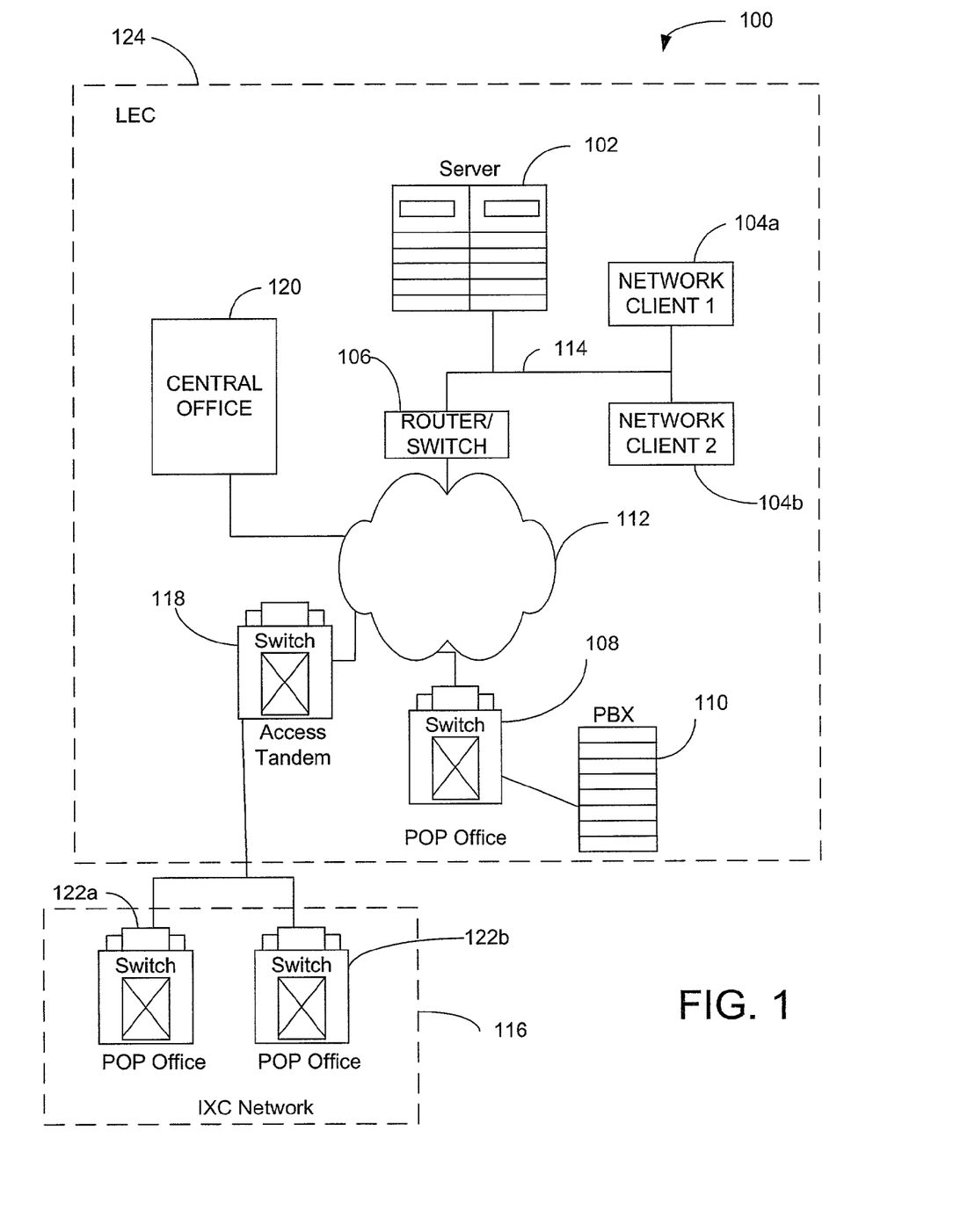
FIG. 1 is a block diagram of an exemplary architecture of a network suitable for practicing the present invention.

Referring to the drawings in general and initially to FIG. 1 in particular, wherein like reference numerals identify like components in the various figures, an exemplary architecture for implementing the present invention is shown and generally designated as operating architecture 100.

The network architecture 100 is merely one example of a suitable architecture and is not intended to suggest any limitation as to the scope of use or functionality of the invention. Additionally, the network architecture 100 should not be interpreted as having any dependency or requirement relating to any one or combination of components illustrated in FIG. 1.

An exemplary network 100 for implementing the invention includes a public or private network 112, such as the Internet, Virtual Private Network (VPN) or other such arrangement, that enables multiple devices to be locally or remotely interconnected to facilitate communication between them. The Internet is a network of networks that enables one computing system to access virtually any other computing system, as well as any database and/or any type of information, anywhere in the world, so long as requisite devices have access to the Internet. VPN, otherwise referred to as a Software-Defined Network (SDN), typically is used by large user organizations that have sites which are geographically dispersed. A terminating location in each of a multi-site enterprise is identified and a level of bandwidth required by each is determined. Dedicated access circuits are then established between each point of termination and the closest VPN-capable InterExchange Carrier (IXC) Point Of Presence (POP). This allows the routing of communication traffic over specified high-capacity transmission facilities on a priority basis, thus creating a level of service equivalent to that of a true private network.

The present invention operates with a variety of connected devices in a network environment, as discussed and illustrated in FIG. 1. In an embodiment of the present invention, a hosting server 102 or multiple servers, provide a central store or repository for the software programs and data required to provide network switch configuration and operations. One or more client computers 104a, 104b provide a user interface and may be used to execute portions or the entire program modules of the present invention. The client computers 104a, 104b are connected to the hosting server 102 on a LAN 114. LAN 114 is in turn connected to an external telecommunications network 112. The devices on the telecommunications network will be described with reference also to FIG. 1. Each device is essentially connected to the network with a dedicated connection or through some other intermediary method.

A dedicated or direct access connection in this context is a connection to a regional or national backbone provider, bypassing any local service providers. Direct access can be on the basis of a number of alternatives including, but not limited to, Dataphone Digital Service (DDS), Trunk Carrier (T-Carrier) (e.g., Fractional T1, T1, T3, etc.). The connection from the network 112 to the LAN 114 is linked to a network interface device, such as router/switch 106, which performs the functions of routing and switching between the external network 112 and the corporate network 114. A router is an intelligent device that supports connectivity between like and disparate LANs. Routers also can provide access to various WANs, such as X.25, ISDN and Frame Relay. Routers generally provide connectivity, addressing and switching.

Another part of the telecommunications network discussed thus far, is the contemporary voice network. Voice and data networks have become very tightly intertwined, particularly when considering broadband infrastructures such as the one shown in the network architecture 100, which has components of both. Voice networks are largely circuit switched networks. Shown in FIG. 1, is a typical Local Exchange Carrier (LEC) 124. LECs 124 provide telephone service, usually within the boundaries of an MSA, state or province. Their primary charter is to provide local voice services through a network 112 of local loops and Central Offices (CO) 120, which can be connected either directly or through a tandem switch to the network 112. LECs may be connected to networks of Interexchange carriers (IXCs or IECs), designated as IXC Network 116. Within an IXC network 116, exist Point Of Presence (POP) offices, which are represented by the switches 122a, 122b. IXCs provide for long-haul, long-distance connections across Local access and Transport Area (LATA) boundaries. IXC network 116 is connected to the LEC through a tandem switch 118. LECs also contain a number of Private Branch Exchanges (PBX) 110, which are connected via a POP office switch 108 to the external network 112.

Although many other components of the network architecture 100 are not shown, those of ordinary skill in the art will appreciate that such components and the interconnection between them are well known. Accordingly, additional details concerning the construction of the network architecture 100 need not be disclosed in connection with the present invention. The network architecture discussed above provides the infrastructure for the system and method of the present invention. Next we turn with reference to FIG. 2, to a discussion on an operating environment such as network clients 104a, 104b, the server 102, or any other computing device that could be used to implement the present invention.

Exemplary Operating Environment

Figure 2:
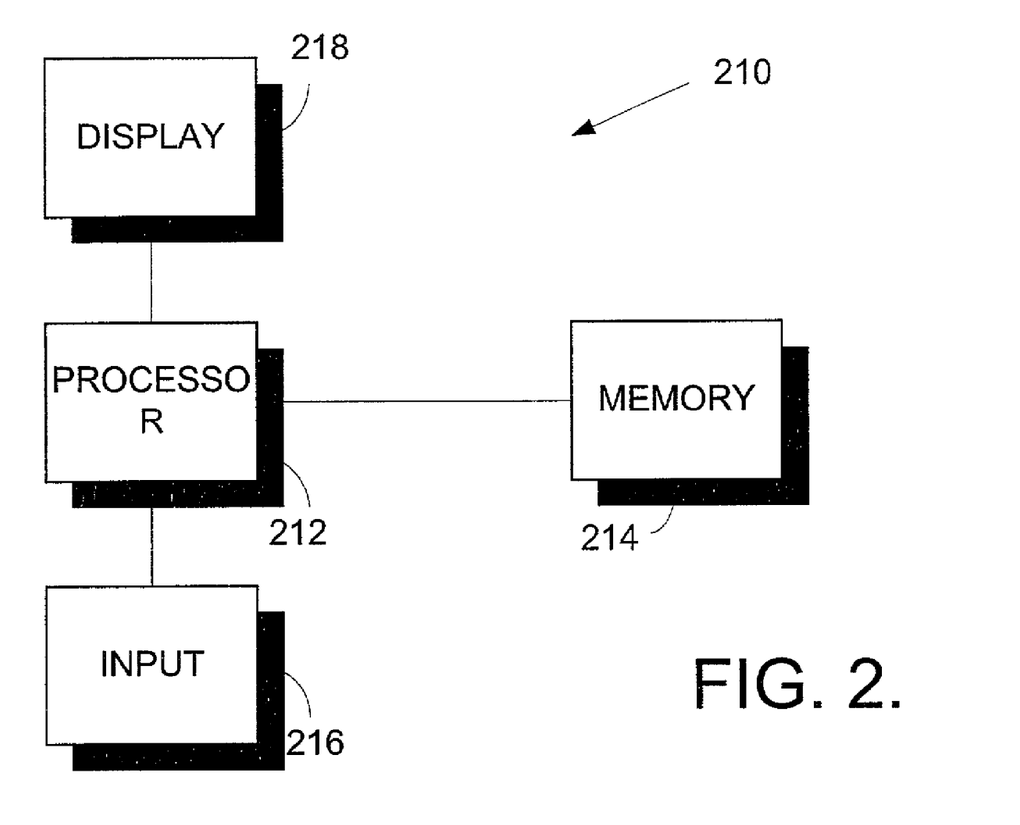
FIG. 2 is a block diagram of a computing system environment suitable for use in implementing the present invention.

Referring to FIG. 2, an exemplary operating environment for implementing the present invention is shown and designated generally as operating environment 210. In its most basic configuration, operating environment 210 typically includes a processor 212 and a memory 214. Depending upon the exact configuration and type of operating environment, memory 214 may be volatile (e.g., random access memory (RAM)), non-volatile (e.g., read only memory (ROM), flash memory, etc.) or some combination of volatile and non-volatile memory. Additionally, operating environment 210 also may have mass storage (removable and/or nonremovable) such as magnetic tape, magnetic disks, and/or optical disks. The operating environment 210 further typically includes an operating system which is resident on the memory 214 and executes on the processor 212.

Operating environment 210 also may include an input 216 and/or an output, such as a display 218. Merely by way of illustration and not restriction, input 216 may be any one of a variety of inputs known in the art, or any combination thereof, such as a keypad, mouse, pen, voice input device, touch input device, and the like. Similarly, output 218 may be any one or a combination of a variety of outputs known in the art such as a display, speakers, printer, and the like. All such devices are well known in the art and need not be discussed at length herein. It will be understood and appreciated that various inputs or outputs may be utilized with the operating environment of the present invention and such variations are contemplated to be within the scope hereof.

As will be understood and appreciated by those skilled in the art, while an embodiment of the present invention is described with reference to a personal computer (PC) environment, other embodiments utilizing alternative computing devices and environments are within the scope of the present invention. By way of example and not limitation, an exemplary PC operating environment is illustrated in FIG. 3.

Figure 3:
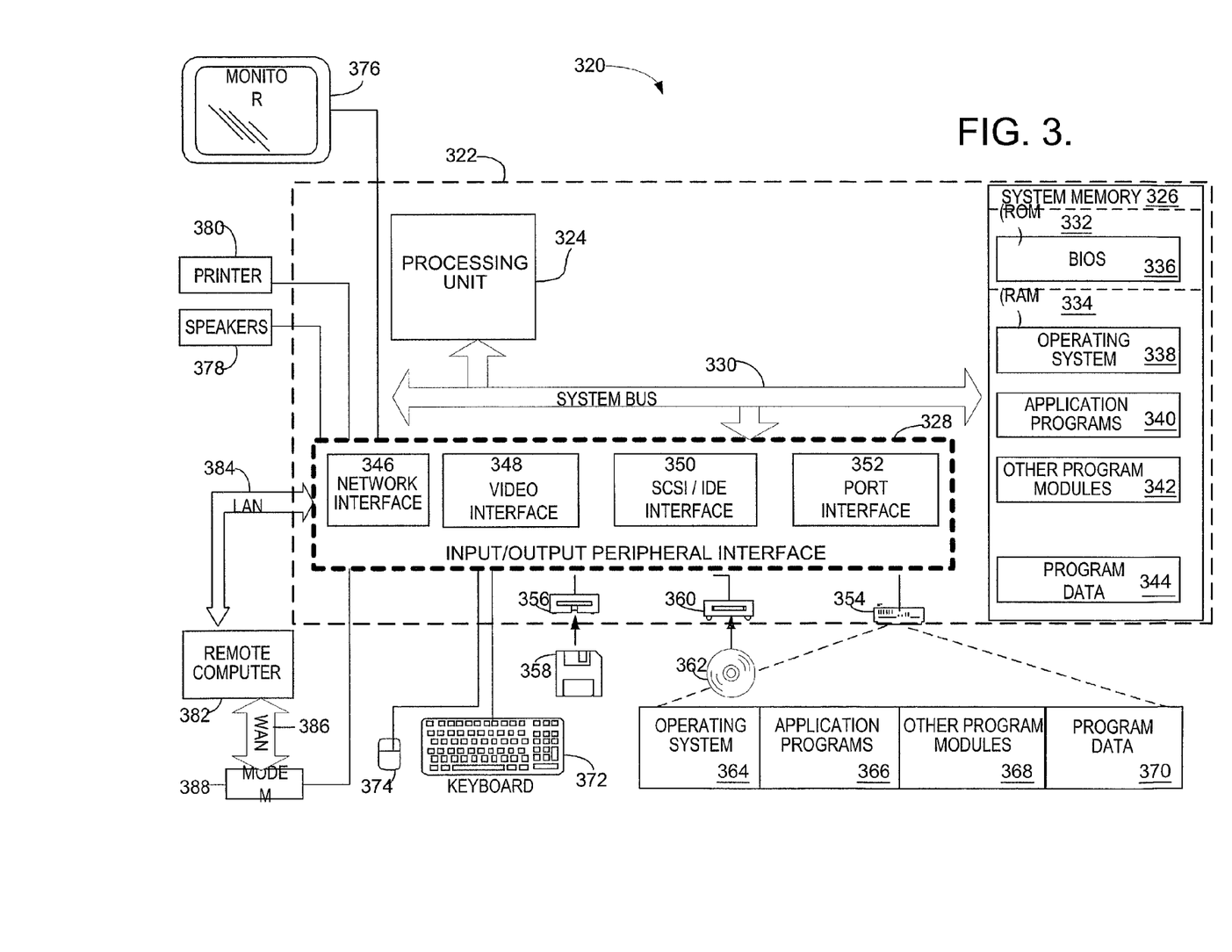
FIG. 3 is a more detailed block diagram of a computing system suitable for use in implementing the present invention.

In greater detail, FIG. 3 illustrates an example of a suitable operating environment 320 on which the present invention may be implemented. Operating environment 320 is a computing system environment and is merely one example of a suitable operating environment. Computing system environment 320 is not intended to suggest any limitation as to the scope of use or functionality of the present invention. Further, computing system environment 320 should not be interpreted as having any dependency or requirement relating to any one of the components, or any combination thereof, illustrated in the exemplary computing environment 320.

The present invention may be described in the general context of computer-executable instructions, such as program modules, being executed by a computer. Generally, program modules include routines, programs, objects, components, data structures, and the like, that perform particular tasks or implement particular abstract data types. Moreover, those skilled in the art will appreciate that the present invention is operational with a variety of additional general purpose or special purpose computing systems, environments, and/or configurations. Examples of well known computing systems, environments, and/or configurations that may be suitable for use with the present invention include, but are not limited to, personal computers, server computers, hand-held or laptop devices, multiprocessor systems, microprocessor-based systems, programmable consumer electronics, network PCs, minicomputers, mainframe computers, and the like. The invention also may be practiced in distributed computing environments wherein tasks are performed by remote processing devices that are linked through a communications network. In a distributed computing environment, program modules may be located in both local and remote computer storage media including memory storage devices.

With continued reference to FIG. 3, an exemplary system for implementing the present invention includes a general purpose computing device in the form of a computer 322. Components of computer 322 include, but are not limited to, a central processing unit (CPU) 324, a system memory 326, an input/output (I/O) Interface 328, and a system bus 330 that couples various system components with one another, including coupling the system memory with the processing unit. The system bus 330 may be any of several types of bus structures including a memory bus or memory controller, a peripheral bus, and a local bus using any of a variety of bus architectures. By way of example, and not restriction, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 322 typically includes a variety of computer readable media. By way of example, and not restriction, computer readable media may comprise computer storage media and communication media. Computer storage media includes both volatile and nonvolatile storage media, and removable and non-removable storage media, each implemented in any method or technology for storage of information such as computer readable instructions, data structures, program modules or other data. Examples of computer storage media include, but are not limited to, RAM, ROM, electronically erasable programmable read-only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 322.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not restriction, communication media includes wired media such as a wired network or direct wired connection, and wireless media such as acoustic, RF, infrared and other wireless media. It will be understood and appreciated that combinations of any of the above also are included within the scope of computer readable media.

The system memory 326 includes computer storage media in the form of volatile and/or nonvolatile memory such as ROM 332 (nonvolatile) and RAM 334 (volatile). A basic input/output system (BIOS) 336, containing the basic routines that help to transfer information between elements within computer 322, such as during start-up, is typically stored in ROM 332. RAM 334 typically contains data and/or program modules that are presently being operated on by processing unit 324, and/or are immediately accessible to the processing unit. By way of example, and not restriction, FIG. 3 illustrates operating system 338, application programs 340, other program modules 342, and program data 344 as data and/or program modules stored in RAM 334.

The I/O Interface 328 includes a variety of components that provide physical connections and communications between peripheral devices and the processing unit 324, system bus 330 and system memory 326 of computer 322. By way of example only, I/O Interface 328 may include network interface 346, video interface 348, Small Computer System Interface (SCSI) or Integrated Device Electronics (IDE) Interface 350, or other mass storage-type interface, and serial, parallel, USB, or other bus-type port interface 352. As will be understood and appreciated by those of skill in the art, I/O Interface 328 may include interface components that are integrated, provided as an add-on hardware device, provided as a software component, or as a combination of software and hardware. All such variations are contemplated to be within the scope hereof.

The computer 322 also may include other computer storage media which may be removable and/or nonremovable, volatile and/or nonvolatile. By way of example only, FIG. 3 illustrates other computer storage media as a hard disk drive 354, a magnetic disk drive 356 and an optical disk drive 360. Hard disk drive 354 reads from and/or writes to nonremovable, nonvolatile magnetic media. Magnetic disk drive 356 reads from and/or writes to a removable, nonvolatile magnetic disk 358. Optical disk drive 360 reads from and/or writes to a removable, nonvolatile optical disk 362 such as a CD ROM, DVD or other optical media. By way of example, and not restriction, other removable/nonremovable, volatile/nonvolatile computer storage media that can be used in the exemplary operating environment include magnetic tape cassettes, flash memory cards, digital video tape, Bernoulli cartridges, solid state RAM, solid state ROM, and the like.

Computer storage media typically is connected to the system bus 330 through I/O Interface 328. Various types of I/O interfaces may be used in the exemplary operating environment 320 and are known to those of skill in the art. For instance, the hard disk drive 354, magnetic disk drive 356, and optical disk drive 360 may be connected to the system bus 330 by a SCSI 350 or IDE Interface. It will be understood and appreciated that the above interfaces are merely examples of interfaces that may be suitable for the exemplary computing system 320 and should not be viewed as limitations of the present invention.

The drives and their associated computer storage media discussed above and illustrated in FIG. 3, provide storage of computer readable instructions, data structures, program modules and other data for the computer 322. In FIG. 3, for example, hard disk drive 354 is illustrated as storing operating system 364, application programs 366, other program modules 368, and program data 370. Note that these components either can be the same as or different from operating system 338, application programs 340, other program modules 342, and program data 344. Typically, the operating system, application programs and the like that are stored in RAM are portions of the corresponding systems, programs, or data read from hard disk drive 354, the portions varying in size and scope depending on the functions desired. Operating system 364, application programs 366, other program modules 368, and program data 370 are given different numbers herein to illustrate that, at a minimum, they are different copies.

A user may enter commands and information into the computer 322 through input devices such as a keyboard 372 and pointing device 374, commonly referred to as a mouse, trackball, or touch pad. Other input devices (not shown) may include a microphone, joystick, game pad, satellite dish, scanner, or the like. These and other input devices often are connected to the processing unit 324, generally through an I/O Interface 328 that is coupled to the system bus 330, more particularly through port interface 352. As previously discussed, input devices may be connected by interface components and bus structures, such as a parallel port, game port or a universal serial bus (USB) port. A monitor 376 or other type of display device also is connected to system bus 330 via an interface such as I/O Interface 328. In addition to the monitor, computers also may include other peripheral output devices such as speakers 378 and printer 380, which also may be connected through I/O interface 328. By way of example only, a typical I/O interface for an output peripheral device such as monitor 376 is a video interface 348.

The computer 322 in the present invention is capable of operating in a networked environment using logical connections to one or more remote computers, such as remote computer 382. The remote computer 382 may be a personal computer, a server, a router, a network PC, a peer device or other common network node, and typically includes many or all of the elements described above relative to the computer 322. The logical connections depicted in FIG. 3 include a local area network (LAN) 384 and a wide area network (WAN) 386, but may also include other networks. Such networking environments are commonplace in offices, enterprise-wide computer networks, intranets and the Internet.

When used in a LAN networking environment, the computer 322 is connected to the LAN 384 through a network interface 346 or adapter. When used in a WAN networking environment, the computer 322 typically includes a modem 388 or other means for establishing communications over the WAN 386, such as the Internet. The modem 388, which may be internal or external, may be connected to the system bus 330 via the I/O Interface 328, or other appropriate mechanism. It will be understood and appreciated by those of skill in the art that the network connections shown are exemplary and other means of establishing a communications link between the computers may be used.

Although many other internal components of the computer 322 are not shown, those of ordinary skill in the art will appreciate that such components and the interconnection are well known. Accordingly, additional details concerning the internal construction of the computer 322 need not be disclosed in connection with the present invention.

When the computer 322 is turned on or reset, the BIOS 336, which is stored in the ROM 332 instructs the processing unit 324 to load the operating system, or necessary portion thereof, from the hard disk drive 354 into the RAM 334. Once the copied portion of the operating system, designated as operating system 338, is loaded in RAM 334, the processing unit 324 executes the operating system code and causes the visual elements associated with the user interface of the operating system 338 to be displayed on the monitor 376. Typically, when an application program 366 is opened by a user, the program code and relevant data are read from the hard disk drive 354 and the necessary portions are copied into RAM 334, the copied portion represented herein by reference numeral 340.

Figure 4:
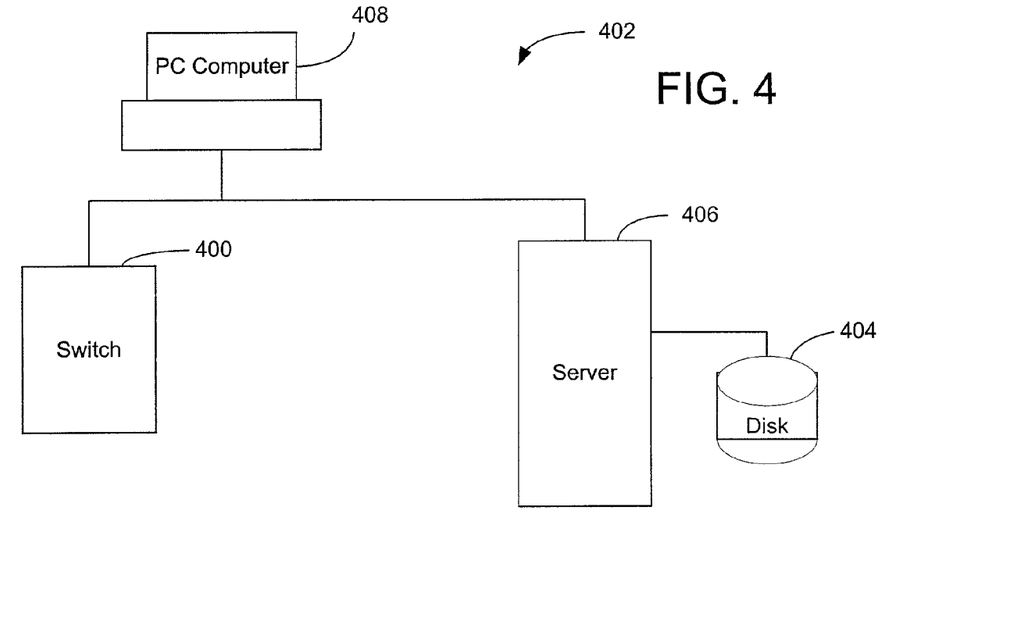
FIG. 4 is a schematic diagram of computer and telecommunications equipment suitable to implement the present invention.

Having thus described the architecture and operating environments for the present invention, a more detailed portion of the architecture of FIG. 1 is now considered. In particular, FIG. 4 depicts the components of a network architecture that can be used to implement the present invention. In other words, from FIG. 1, a client computer 104a, a server 102 and any switch 108, 118, 122a, or 122b.

System and Method for Universally Generating Commands

As generally depicted in FIG. 4, the present invention may be used on a personal computer 408, in conjunction with or on a server 406 to provide and access data stored on a disk 404. The illustrated system of FIG. 4 enables the set up of call routing in one or more telecommunications switches 400. A switch 400 provides telecommunications services in a metropolitan statistical area (MSA) or other geographic area. A switch 400 could be a voice-over-IP routing switch (often referred to herein as merely "switch" or "switches") such as the service manager switches manufactured by GTE or the Service Gateway Service manager switches manufactured by Telcordia. Each switch supports a plurality of data tables that contain, among other things, call routing information or data used to route calls serviced by the switch. Two such tables are the Digit Translator and Group Translator tables which were earlier identified. The process for setting up a new switch 400 or implementing a new service on an existing switch 400 such as adding an MSA, begins when an operator or administrator at a telecommunications company such as a network translations person uses an application program on the computer 408 to enter or access information on the server computer 406. The computer 408 either directly or through the server 406 is able to load the tables of the switch 400 with information that is initially stored on disk 404. The process that occurs on a computing system such as computer 408 to enable the creation, manipulation and formatting of the necessary data for switch 400, is best described with reference to a systems architecture of the present invention.

Figure 5:
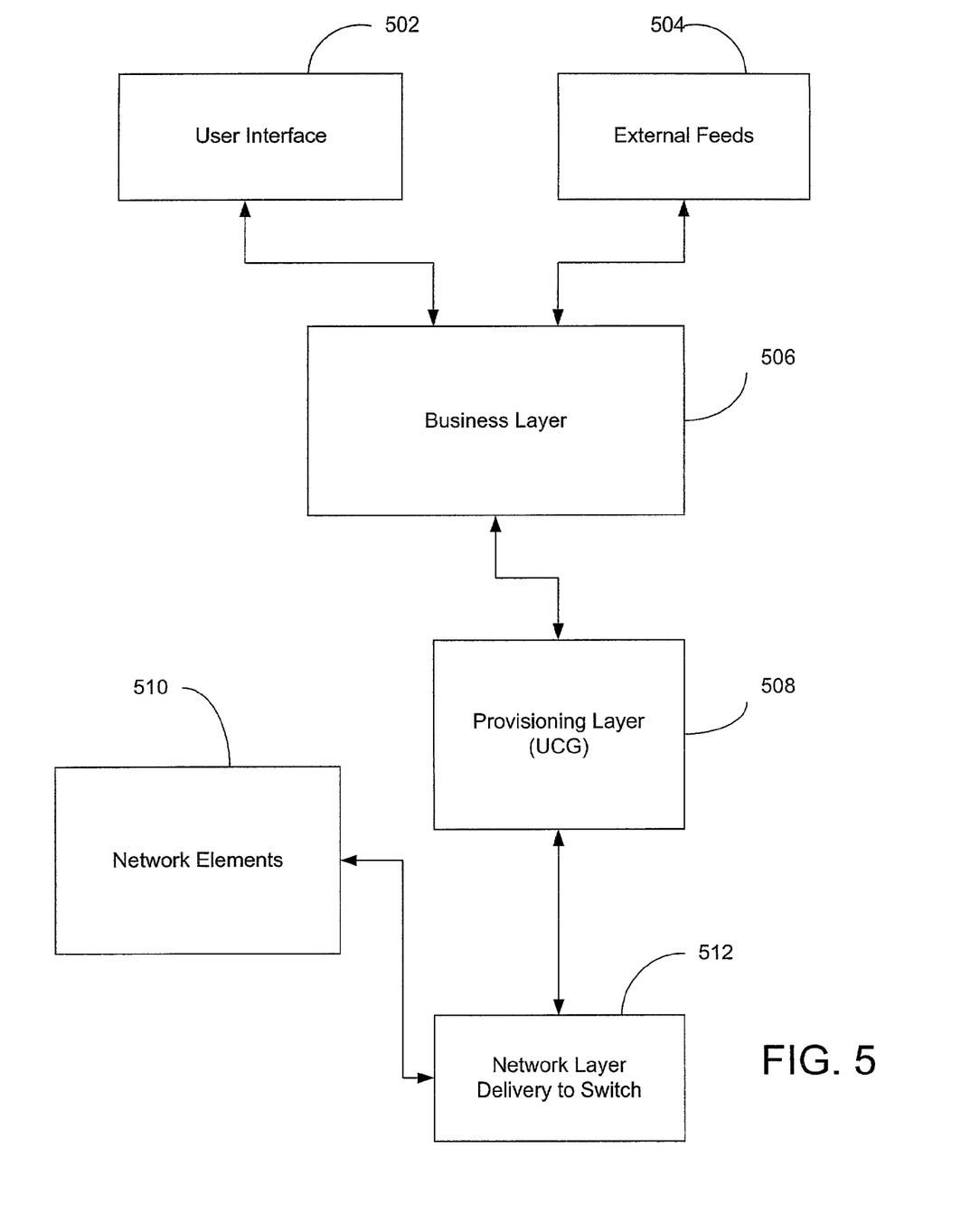
FIG. 5 is an architectural diagram depicting the layers of the present invention.

FIG. 5, illustrates a high level architecture of the layers involved in an implementation of the present invention. Generally speaking, a user interface 502 in combination with some other external feed 504, are the source of desired system changes. Particularly, user interface 502 allows a user to input desired service changes to the system, such as specifying a requirement to add new area codes to an MSA. External feed 504, provides information on the current state of the system. The combined information of user request and system status then enables a determination of what is needed to allow the user's desired changes to be accomplished.

A business layer 506, provides an information store for business driven demands. As previously stated, these demands are independent of the network demands. In other words, this layer is in no way concerned with how to accomplish the changes to the system rather, the focus is on what those changes need to do. The user interface 502 request and external feed 504 information are passed to the business layer 506, and the separation process of business logic and system logic takes place. The required changes to the system are determined at this level and then passed on to a provisioning layer 508. As indicated in the architecture drawing of FIG. 5, all communications between the various layers are bi-directional. For example, there is communication in the form of responses from the business layer 506 to the user interface 502 and external feed 504. Similarly, there is a response from the provisioning layer 508 to the business layer 506 and so on.

Provisioning layer 508, enables the UCG of the present invention to generate commands that will implement the desired system changes. These commands must then be passed on to the switches on the network. This is accomplished by providing the commands to a network delivery layer 512.

Network layer 512, in combination with network elements 510, deliver the commands to the switch. Network elements 510 are parts of the network that interact with the delivery mechanisms to the switch. For example, while it is clear which particular switch on the network needs to be loaded with information, it will still be necessary at the point when delivery is to be implemented, to obtain other network information such as, the address or packet routing mechanism to reach the particular switch.

Having discussed the overall architecture for the present invention, we focus next on two particular layers of the architecture, namely the business layer 506 and the provisioning layer 508, wherein the present invention is implemented. The functions that take place within these two layers will be discussed with reference to the information flow diagram of FIG. 6.

Figure 6:
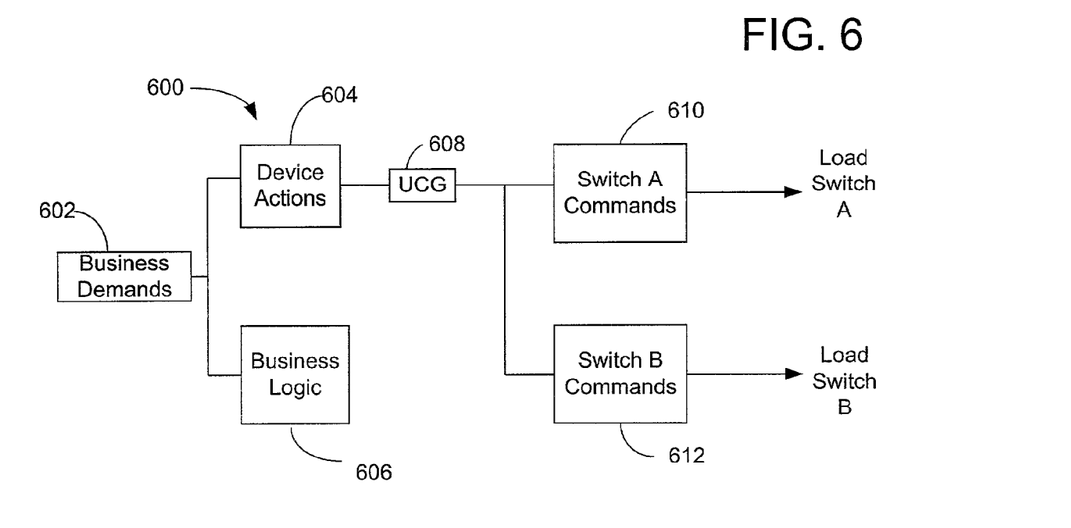
FIG. 6 is a flow chart for an exemplary implementation of the present invention.

FIG. 6 illustrates the progression of information from the point where a business demand for a service is initiated, through to the implementation on the network switches. In accordance with the previous discussion on the receipt of business requests by the business layer 506 of FIG. 5, a business demand is shown at step 602 and initiates the process. As previously noted, business demands can arise from a number of situations; for example, voice activated dialing service. Regardless of the origin, a separation of business logic and network or device logic must first occur as shown at step 604 and 606, this enables changes to be made to one set of logic without necessarily impacting the other. In other words, the logic or actions that must be specifically performed by individual switches on the network are separately considered. At step 608, a Universal Command Generator (UCG) program of the present invention, receives from step 604 the actions that must be performed on a switch. Through a series of steps and procedures that will be later discussed, commands are generated for each of the affected switches. As shown, at step 610 commands are generated for a switch A. Commands are also generated for switch B, at step 612. Each of the command sets 610,612 are ultimately loaded into the appropriate switch. It should be understood that switch A and switch B, could be identical models but with different fields or could be dissimilar brands with nothing in common.

Having generally discussed the information flow for the present invention, we turn next to a particular example of a business demand and at some exemplary resulting data tables.

The process for setting up a new switch or updating an existing switch begins when an operator or administrator at a telecommunications company such as a network translations person uses a computer to enter information. For illustrative purposes, assume that the user entered information relates to call routing criteria for an MSA of interest. This information would include NPAs, NXXs, dialing patterns, trunk groups, terminating end offices, and files that are used to differentiate between local and long distance calls. This information is transferred to storage on a server computer where it is analyzed by an MSA build utility program or other program residing on or accessible by the server computer. The server computer then automatically creates output files, including a Digit Translator table and a Group Translator table, for setting up core call routing for the new switch or the new MSA being added to the switch. The output files are transferred from the server computer to the user computer. An operator of the user computer may add additional call routing data and/or files to the output files and then transfers the completed files for downloading to the switch. These files may be internally organized in any one of several formats such as, a particular ordering of the supplied data.

For example, a user typically provides certain MSA and switch information to identify the MSA for which call routing is to be created (for example, New York). The user also provides an ID for the switch handling call routing for the MSA (for example, 2055), and MSA name description (for example, New York). This is usually followed by providing certain NPA and NXX information for the selected MSA. To do so, the user enters the NPAs owned by the telecommunications company providing services in the area. The user also enters the associated internal and external dialing patterns for each NPA. Provided for each NPA are associated NXXs, assigned portability indicators and a locality name for each NXX. All of this information is organized in an order that is suitable for the intended switch tables. For example, the Digit Translator table, which includes information used to group sets of phone number digits together, where these are phone numbers that should be routed and charged the same, is one such table. Another table, is a Group Translator table, which includes information used for routing and charging calls based on the grouping of digits in the Digit Translator table. The data is organized according to a format that is specifically suited for input into each individual table. Examples of completed data files for both the Digit Translator and Group Translator tables, arranged with pipe ('|') delimiters, are shown as follows:

Digit Translator translator_name|from_digits|to_digits|minimum_digit_length|maximum_digit_length|portability_indicator|operator_group_name|non_operator_group_name|comment|action
203636|2|9|10|10|1|misdialing10_rte|misdialing10 rte||
203636|203201|203201|10|10|1|oper_inter|dms_inter||
203636|203202|203202|10|10|2|oper_inter|dms_inter||
203636|203204|203204|10|10|2|oper_inter|dms_inter||
203636|203205|203205|10|10|2|oper_inter|dms_inter||
203636|203206|203206|10|10|1|oper_inter|dms_inter||
203636|203207|203207|10|10|2|oper_inter|dms_inter||
203636|203208|203208|10|10|2|oper_inter|dms_inter||
203636|203209|203209|10|10|2|oper_inter|dms_inter||
203636|203210|203210|10|10|2|oper_inter|dms_inter||
203636|203213|203213|10|10|1|oper_inter|dms_inter||
203636|203214|203214|10|10|1|oper_inter|dms_inter||
203636|203215|203215|10|10|1|oper_inter|dms_inter||
203636|203216|203216|10|10|1|oper_inter|dms_inter||
203636|203217|203217|10|10|1|oper_inter|dms_inter||
203636|203218|203218|10|10|1|oper_inter|dms_inter||
203636|203220|203220|10|10|2|oper_inter dms_inter||
203636|203221|203221|10|10|2|oper_inter|dms_inter||
203636|203222|203222|10|10|2|oper_inter dms_inter||

Group Translator translator_name|group name|prefix_type_name|originating_class_code_name|originating_area_name|secondary_classmark_list|geographic_area_name|Charge_class_name |next_translator_type|next_translator_name|delete_digit_count|prepend|digits|build_out_digits|build_out_digits_code_length|routing_class_type|routing_class_name|comment|action 203636|dms_inter|dddplus|@|@|@|@|interlata|||||2|nyc__250_rte||

203636|dms_inter|noprefix|@|@|@|@|norecord|||||2|misdialing_cause__10_rte||

203636|dms_inter|noprefix|@|@|@|@|norecord|||||2|misdialing_cause__10_rte||

203636|dms_intra|dddplus|@|@|@|@|interlata|||||2|nyc__250_rte||

203636|dms_intra|noprefix|@|@|@|@|norecord|||||misdialing_cause__10rte||

203636|HNPA_102_10d|DDDPLUS|@|@|@|@|norecord|||||||2|misdialing_cause_N8_N9_rte||

203636|HNPA_102_10D|NOPREFIX|@|@|@|@|local|||||||1|||

203636|hnpa_102_7d|dddplus|@|@|@|@|norecord|||||||2|misdialing_cause_n8_n9_rte||

203636|hnpa_102_7d|noprefix|@|@|@|@|local|||||203||1|||

203636|hnpa_203_10d|dddplus|@|@|@|@|norecord|||||||2|misdialing_cause_n8_n9_rte||

203636|hnpa_203_10d|noprefix|@|@|@|@|local|||||||1|||

When new NPA/NXX combinations are added to a telecommunications network, they must be added to each switch providing services in the area. Computer programs implementing modules of the present invention may be used to create new rows in the Digit and Group Translator tables for the new NPA/NXX combinations. The text files generated in this manner, similar to those shown above, may then be downloaded to the appropriate switches to implement the new additions at the network level.

Next we turn to the particular logic and implementation of the UCG 608 of the present invention. The details of the operation of the UCG will be discussed with reference to FIG. 7 and some exemplary object oriented classes and methods. UCG generates commands to populate data tables such as the Group Translator and Digit Translator tables, which were earlier discussed. In an embodiment of the present invention, the UCG comprises four main components namely, a service interpreter 702, a command factory 704, a command builder 706 and one or more commands 708. UCG is essentially an architecture that provides a set of reusable object oriented classes for use in network element command generation. As described earlier, current systems intermingle the business logic of a particular system with the command generation for a network device. UCG allows systems to segregate business logic from the technology specific record creation that is needed for network switches.

Figure 7:
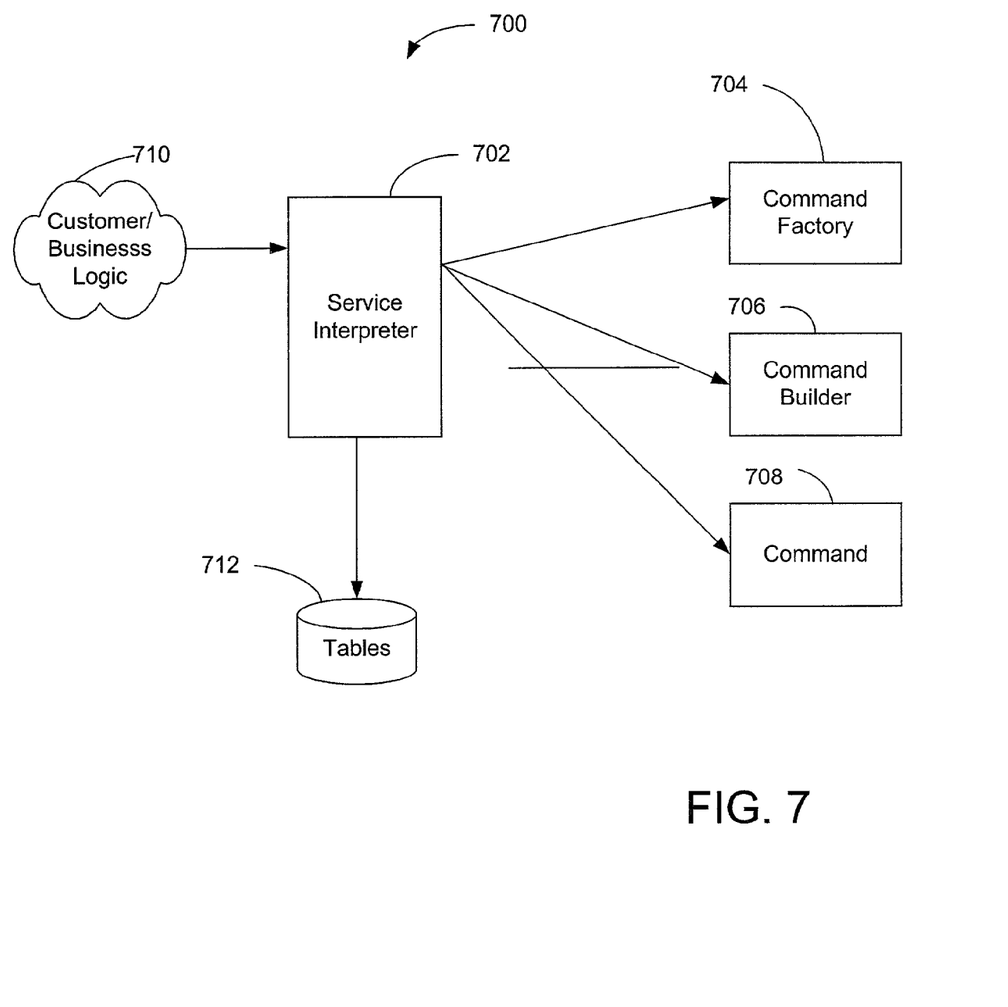
FIG. 7 is a block diagram illustrating the components of the present invention.

The nature of an application in which UCG will be utilized will typically dictate the number of UCG servers that are needed. A UCG server provides a repository for device specific commands that are generated by UCG. As such, a single UCG server may be designated for each of a variety of network switches. In other instances, when the application consists of multiple services, and each service is responsible for updating different tables in a single switch, a UCG server may be designated for each service. In any case, every UCG server will implement the following four object oriented classes: ServiceInterpreter{ }, CommandBuilderFactory{ }, CommandBuilder{ }, and Command{ }. Each of these classes are represented by the earlier identified components respectively: service interpreter 702, command factory 704, command builder 706 and command 708.

In accordance with the earlier discussion of the present invention and as shown, inputting customer or business logic 710 is the initiating process. Business logic 710 has no relationship to the logic that will run the network. As such, data and a service name corresponding to the business logic 710 are passed to service interpreter 702. Service interpreter 702 makes the received data network specific and uses the service name to obtain the names of all the switch tables that need to be populated in order to provide the service. In other words, service interpreter 702 determines the commands that need to be built for a particular service.

In operation, UCG is implemented with a program source code by a developer. The developer's program utilizes known techniques within the art to access the object modules or other similar implementations of UCG, and is generally referred to as a client application. The ServiceInterpreter { } class provides the interface that a client application will use to access the UCG server. Generally, a list of available telecommunication services are stored in a data base table 712. Also stored is a list of the tables within each network element, which have to be built. As stated earlier, the ServiceInterpreter { } class which corresponds to service interpreter 702, is invoked with data and a service name. When this class is invoked there is a lookup to determine the applicable tables to be populated for the specified service. The names of these applicable tables are then passed on to the other UCG classes.

Service interpreter 702 sends the table names to command factory 704. Command factory 704 holds a list of pointers to individual command builders 706. In response to the receipt of table names, command factory 704 sends command builder pointers back to the service interpreter 702. A pointer to command builder 706 is sent for each one of the received table names.

In operation, only a single instance of CommandBuilderFactory{ } object class is created and allowed per process on the computer system. This command builder factory class is responsible for managing all of the different CommandBuilder { } object classes. CommandBuilderFactory { } accepts a table name as an argument and returns a pointer to the appropriate CommandBuilder{ }.

Command builder 706 contains the logic to create the command that is appropriate to the service. Service interpreter 702 calls command builder 706 with the appropriate data for the service. Command builder 706 then builds a command which becomes a row entry in a designated table.

In operation, CommandBuilder{ } provides four virtual methods—buildCommand( ), refreshList( ), insertCommands( ) and deleteCommands( ). A single CommandBuilder class is derived for each network element table. For example, with reference back to MSA and the two tables Digit Translator and Group Translator, there would be two derived classes that inherit from the base class CommandBuilder{ } namely, DigitCommandBuilder and GroupCommandBuilder. As such, each of these derived classes would populate its own table.

Turning to the methods of CommandBuilder{ } class, each class must implement the buildCommand( ) method, which returns a Command 708. The buildCommand( ) method must be able to handle all of the different services that could have originated from the service interpreter 702. As stated earlier, each Command 708 that gets returned is different depending on the service. Any successfully built Command 708, is stored in an internal linked list, which continues to grow until the client application invokes the insertCommands( ) method. InsertCommands( ) method pops each Command 708 off the linked list and causes a record to be created in the appropriate table of the network element, the switch. Another method that is provided by the CommandBuilder{ } class is the deleteCommand( ) method, which causes all Command 708 to be deleted from the linked list. The refreshList( ) method, accepts as an argument, the identification of a linked list that is to be refreshed. In some cases where the network element table is sufficiently small, the table is read into volatile memory for faster access. However, because such tables can and do change, a method is provided to refresh the information.

When the full list of commands have been created, service interpreter 702 instructs command builder 706 to insert the commands into the appropriate tables to be sent to the switch.

A call from command builder 706 to command 708 causes the commands to be inserted in the tables. Command 708 represents a row in a specific table.

In operation, Command{ } is the lowest level class of the present invention with two virtual methods—buildTuple Txt( ) and insert( ). An inherited Command{ } class is created for each network element table that is to be automated, in the system. For example, the MSA example would have two inherited classes namely, DigitTrnsltrCommand and GroupTrnsltrCommand. The insert( ) method inserts a record into the network element table. The buildTupleTxt( ) method builds the command text field (cmd_txt) in the network element table. Cmd_txt contains the actual command or record that will be sent to the network element and actually inserted into one of the element's tables. BuildTupleTxt( ) method builds a string of the member variables of the derived class with a pipe (|) delimiter between data fields. This string is what gets inserted into the network element table when the insert( ) method is called.

Having described an embodiment of the present invention, it would be apparent to those skilled in the art, that the system and method of the present invention is highly flexible in its application. For example, continuing with the telecommunications network scenario, UCG can be used to build commands for multiple tables in a particular switch. UCG can create batch files of commands to be transmitted to a switch. UCG can also generate commands, passing them in real time to a switch via an interface such as a CORBA interface. Furthermore, UCG can be implemented as part of a core server or completely separated. Even further, UCG can be used to build commands that are simultaneously passed to switches from different manufacturers. As would be further understood by those skilled in the art, UCG can also be used to populate any data tables other than those relating to switches, as long as default values and rules for populating the tables can be adequately described and specified.

The system and method of the present invention provides numerous advantages which include but are not limited to, minimizing the impact of device changes and facilitating the implementation of business logic across multiple or dissimilar computing devices, by segregating business logic from the specific logic of the computing devices. A further advantage of the present invention lies in the automated generation of commands or other data to populate tables of a database. An even further advantage of the present invention is the fact that switches on a telecommunications network can be updated or programmed with minimal effort once services and associated commands have been identified for the available switch models.

The present invention has been described in relation to particular embodiments which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and within the scope of the claims.

We claim:

1. A computer readable medium having computer executable instructions embodied thereon for performing a method of building commands useable by a computing device in a telecommunications network to provide instructions on performing a task, the method comprising:
   interfacing with a client application to receive a plurality of data and a service identification, wherein the plurality of data and the service identification both correspond to business logic that has no relationship to the computing device;
   accessing a database containing a list of available services;
   correlating the received service identification with an available service from the list of available services;
   utilizing the available service correlation to generate a list of table names,
      (1) wherein each table name corresponds to a table that must be populated to instruct the computing device to perform the task, wherein the task relates to a change of at least one telecommunication service in a geographic area, and
      (2) wherein the change impacts a plurality of subscribers of the telecommunications network;
   sending the list of table names to a command factory, which stores a list of pointers to one or more command builder components,
   receiving from the command factory, one or more pointers to one or more command builder components,
      (1) wherein a pointer to a command builder component is received for each of the table names sent to the command factory, and
      (2) wherein each command builder component generates one or more commands, wherein each generated command causes a record consisting of an ordered text string of fields to be created in an appropriate table when executed;
   storing each command generated by each command builder component in a generated command list;
   receiving an indication from the client application that every command in the generated command list should be executed; and
   instructing each command builder component for which a pointer was received to execute it's corresponding one or more generated commands, wherein upon execution of the one or more generated commands, the computing device is able to perform the task.

2. The computer readable medium of claim 1, wherein the computing device is a switch and wherein the plurality of data received from the client application relates to call routing criteria for a Metropolitan Statistical Area (MSA) of interest.

3. The computer readable medium of claim 2, wherein the plurality of data received from the client application includes one or more of dialing patterns, trunk groups, terminating end offices, and files used to differentiate between local and long distance calls.

* * * * *